Dec. 19, 1967     A. M. EL-HINDI     3,358,834
METHOD AND APPARATUS FOR FILTERING LIQUIDS
Filed Feb. 17, 1965     3 Sheets-Sheet 1
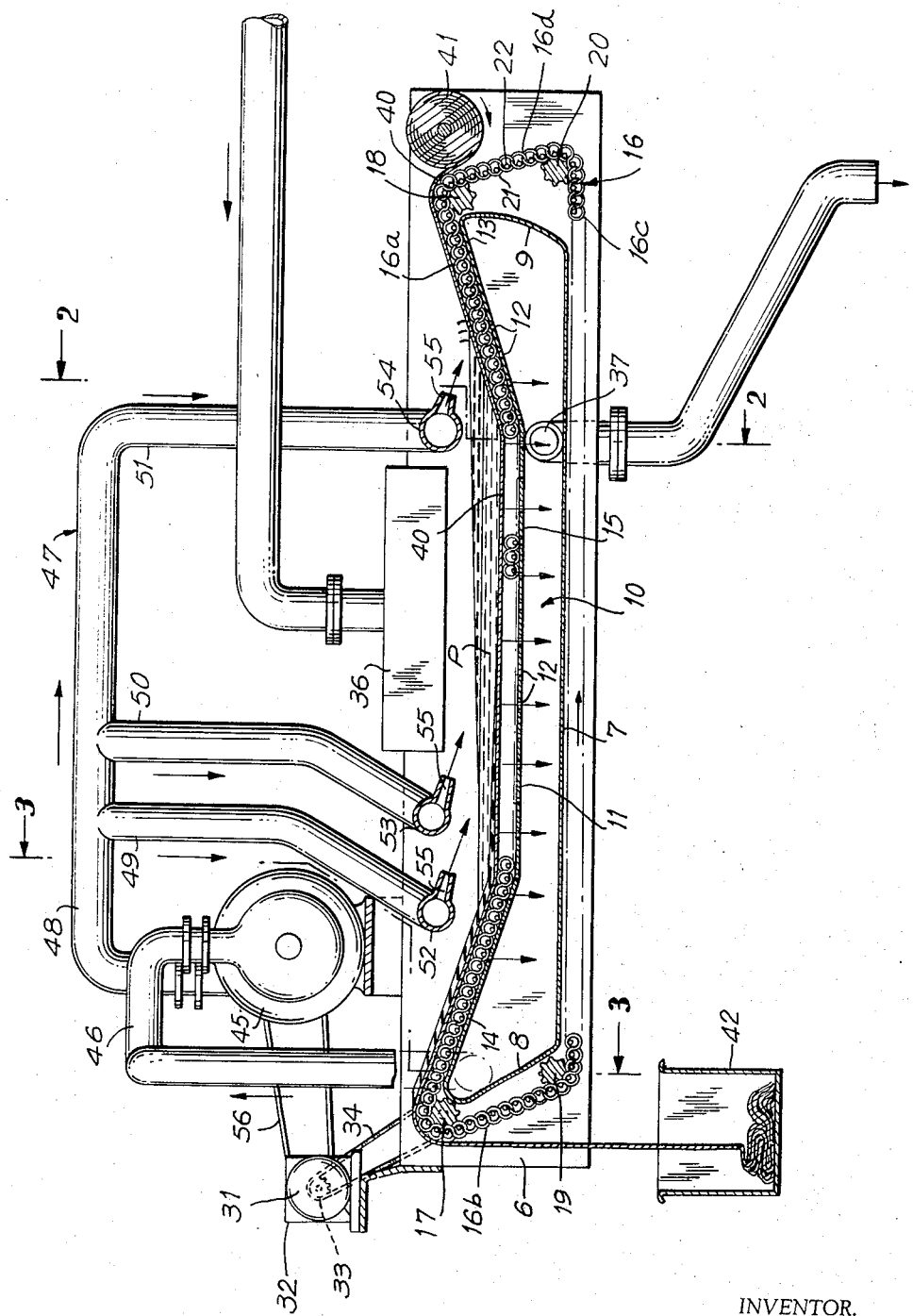
INVENTOR.
AHMAD M. EL-HINDI
BY
Curtis, Morris & Safford
ATTORNEYS

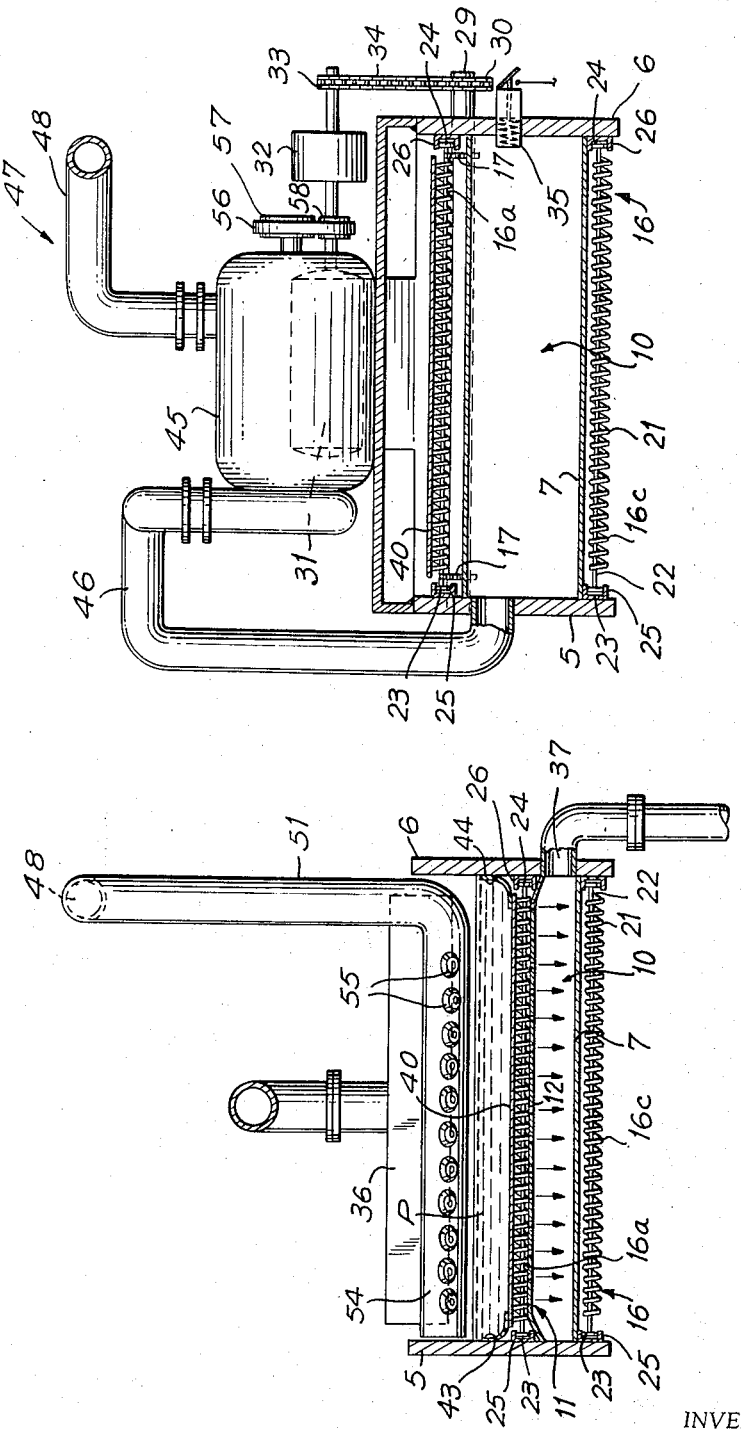

Dec. 19, 1967  A. M. EL-HINDI  3,358,834
METHOD AND APPARATUS FOR FILTERING LIQUIDS
Filed Feb. 17, 1965  3 Sheets-Sheet 3
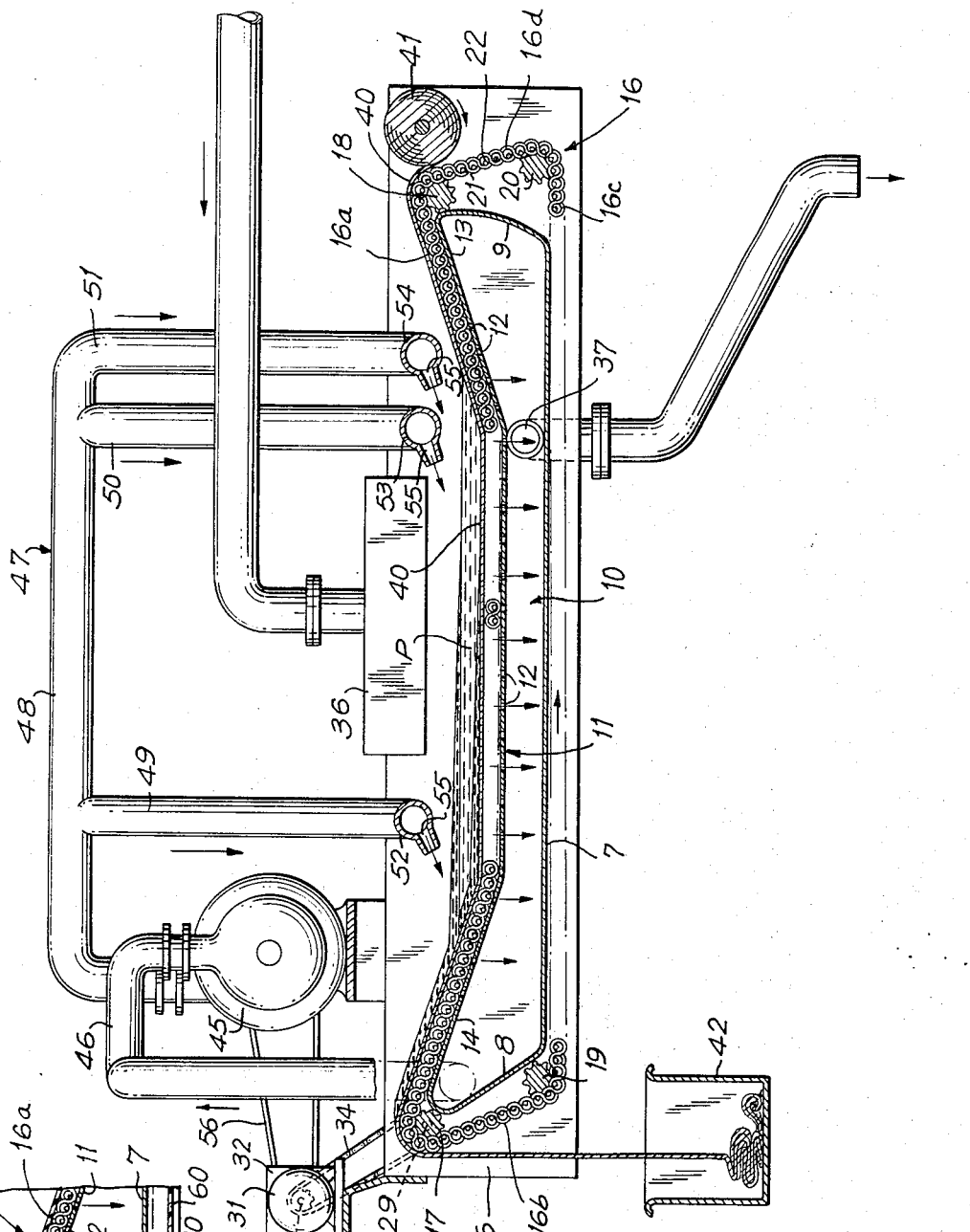
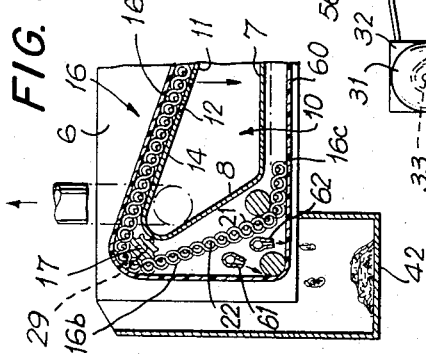
INVENTOR.
AHMAD M. EL-HINDI
BY
Curtis, Morris & Safford
ATTORNEYS

United States Patent Office 3,358,834
Patented Dec. 19, 1967

3,358,834
METHOD AND APPARATUS FOR FILTERING LIQUIDS
Ahmad Mahamad El-Hindi, East Syracuse, N.Y., assignor to Belson Corporation, New York, N.Y., a corporation of New York
Filed Feb. 17, 1965, Ser. No. 433,426
11 Claims. (Cl. 210—73)

The present invention relates to filters and more particularly to improvements in filters of the type described and claimed in United States Letters Patent of Charles A. Wallace et al., No. 2,983,383 issued May 9, 1961.

The filter illustrated and described in said patent comprises a long sheet of filter paper which is supported by and conveyed on a porous conveyor belt, and the fluid to be filtered is delivered onto the top of the filter paper. Underlying the filter paper and conveyor is a sump tank which is maintained under a partial vacuum to promote the flow of liquid through the paper. The rate at which the conveyor belt and strip of filter paper are advanced is controlled by the degree of vacuum or absolute pressure occurring at the underside thereof. As the pressure below the filter paper decreases, due to clogging of the pores of paper by sludge so that less air and/or liquid can flow therethrough, the belt and filter paper are advanced to bring in a new section of clean filter paper at one end which again increases the pressure as the filtering continues. A filter cake is built up on the top of the filter paper which is progressively dried by the flow of liquid therefrom and air therethrough. At the end of a horizontal run the filter paper and filter cake built up thereon are discharged into a disposal bin and the conveyor belt returns to its starting place to underlie new sections of filter paper as it feeds into the filter unit.

Such filters operate quite satisfactorily and are adapted for a number of different uses such as filtering coolant used in processing metals as, for example, in rolling mills and machine cutting tools. These coolants are usually emulsions of oil or other emulsifiable compounds and water which are used to lubricate as well as cool the parts being processed and they vary from tight to loose emulsions. For example, an accepted practice is to use a relatively unstable emulsion for rolling steel sheet to simulate the results previously obtained by using palm oil dispersed in water. In loose emulsions the oil or other compound has a tendency to separate therefrom and float on the top thereof, but in tight emulsions the tendency to separate is much less. Also such filter paper when wetted with emulsion will not pass separated oil and, vice versa, when wetted with oil it will not pass emulsion at a difference in pressure normally used. Thus, any oil separated from the emulsion floats on the surface of the emulsion and will ultimately be discharged with the filter cake.

On the other hand, when tight emulsions are used no particular problem is presented in passing separated oil through the filter paper, but tramp oils, such as lubricants used in the bearings of rolling mills or other machine tools with which the coolant emulsion is used, are apt to be carried to the filter with the coolant. These tramp oils will not mix with the emulsion and if permitted to accumulate and in some way be delivered back to the rolling mill or machine tool with which the emulsion is used they are apt to damage the work, especially in rolling mills. The tramp oil floats on top of the liquid being filtered and as it accumulates it may first engage the clean end of the filter medium and block the filter to the flow of coolant emulsion.

One of the objects of the present invention is to provide an improved method of and filter for continuously skimming any free oil from the surface of the liquid being filtered.

Another object is to provide an improved method of and filter for simultaneously filtering emulsion and any oil separated from the emulsion.

Another object is to provide an improved method of and filter for removing tramp oil from a liquid being filtered and discharging it from the filter system.

Still another object is to provide an improved filter which is of simple and compact construction, economical to manufacture and one which is particularly effective in skimming oil from the surface of a liquid being filtered either for delivery through the filter or for discharge from the filtering system.

These and other objects will become more apparent from the following description and drawings in which like reference characters denote like parts throughout the several views. It is to be expressly understood, however, that the drawings are for the purpose of illustration and are not a definition of the limits of the invention, reference being had for this purpose to the appended claims.

In the drawings:

FIGURE 1 is a sectional view of a filter unit in side elevation which incorporates the novel features of the present invention and shows the air jets for skimming one liquid from the surface of another liquid and contacting it with one end of the filter medium before the filter medium is contacted by the other liquid;

FIGURE 2 is a transverse sectional view taken on line 2—2 of FIGURE 1 to show the sump tank and conveyor for supporting the medium;

FIGURE 3 is a transverse sectional view taken on line 3—3 of FIGURE 1 to show the vacuum pump for evacuating the sump tank and the drive for advancing the conveyor and sheet of filter medium thereon;

FIGURE 4 is a view similar to FIGURE 1 but showing the nozzles turned to direct jets of air toward the discharge end of the filter medium for skimming the one liquid from the top of the other liquid and delivering it onto the top of the filter cake; and FIGURE 5 is a view similar to FIGURE 4 showing a modified filter medium in the form of a continuous sheet from which the filter cake is discharged.

The method of the present invention comprises the steps of delivering the liquid to be filtered onto the top of a disposable or permanent filter sheet to form a pool of the liquid on the top thereof. The space underlying the filter medium is evacuated to produce a partial vacuum or lower absolute pressure than atmospheric to promote and control the flow of liquid and air through the filter medium. The advance of the filter medium is controlled by the degree of vacuum to advance a new length of clean medium when the pressure below the medium decreases and stop the advance when the pressure increases. The method is particularly adapted for selectively filtering two immiscible liquids and for purposes of description the two liquids will be referred to, by way of example, as a coolant emulsion and oil. Such coolant emulsions are used in rolling mills where the coolant washes particles of metal and oxide of the metal from the surface of the sheet and which will be filtered out by the passage of the emulsion and/or rolling oil through the filter medium.

The oil occurring with the coolant emulsion may be that which has separated from the emulsion, or may be tramp oil delivered with the emulsion into the pool from the apparatus in which the coolant is used. When the oil is that which has become separated from the emulsion, it is desirable to retain this oil and filter it with the emulsion. With conventional filtering methods this is impossible because the filter medium when wetted with emulsion, on the one hand, will not pass oil therethrough, and when wetted with oil, on the other hand, will not pass emulsion.

In accordance with the present invention the separated oil which floats on the top of the emulsion is skimmed from the surface and directed toward one end of the filter medium. When the oil is that which has become separated from a loose emulsion, the skimmed oil is directed toward the end of the filter where the filter medium enters the pool of liquid. Thus, the clean filter medium is first wetted by and filters the oil as it passes therethrough. Due to the fact that there is a limited quantity of the oil, a large quantity of air will flow through the filter medium which blows all of the oil therefrom before the filter medium enters the emulsion. Then as the filter medium enters the emulsion it is so cleaned of the oil that it will become wetted with the emulsion which then flows therethrough. Thus, the same filter medium successively acts as two separate filters, first for the separated oil and then for the emulsion. As a result, both the separated oil and emulsion are filtered and the oil is returned with the coolant emulsion to a circulating system including a pump where it will be reintroduced into the emulsion as it is pumped through the system. Thus, the method of the present invention is particularly adapted for use with loose emulsions from which the oil tends to separate.

The method may also be used for separating and removing tramp oil from tight emulsions. In this modification of the method the direction of the air jets is reversed to continuously skim the tramp oil from the surface of the emulsion and direct it toward the end of the filter medium leaving the pool of liquid and onto the filter cake built up on the filter medium. Thus, the tramp oil is absorbed by the filter cake and removed with filter medium from the filter system.

The method may be used with a disposable filter medium in the form of a continuous sheet or permanent belt of filtering material supported by a conveyor. In either case the filter medium is moved downwardly along one end of a pool of liquid and then upwardly and outwardly from the pool. The air jets for skimming the oil from the surface of the coolant emulsion may be supplied from any suitable source or may be the air discharged from the vacuum pump. When the filtering medium is a disposable sheet of paper the filter cake and/or tramp oil will be discharged into a container; and when a permanent belt is used as the filter medium the filter cake is removed by air or steam jets into a suitable receptacle to clean the belt.

Filtering apparatus for carrying out the steps of the method is shown in the drawings. In the embodiment of the invention illustrated in FIGURES 1 to 5, the filter comprises side plates 5 and 6 having a transverse bottom wall 7 and inclined walls 8 and 9 to form a sump tank 10. The top of the sump tank 10 is covered by a reticulated supporting plate 11 having a series of holes 12 through which liquid can drain into the sump tank. The supporting plate 11 has a downwardly inclined end 13 at the right hand end of the tank as viewed in FIGURE 1, an upwardly inclined end 14 at the left hand end of the tank and a horizontal section 15 between the inclined ends.

An endless conveyor 16 is mounted to move around the sump tank 10 and has a top run 16–A between sprockets 17 and 18 and overlying the top plate 11. A section 16–B of conveyor 16 extends downwardly from sprocket 17 adjacent the end wall the sump tank 10 and around a sprocket 19. From sprocket 19 the conveyor has a horizontal return section 16–C under the tank which then turns around sprocket 20 with an end section 16–D extending up adjacent the end wall 9 of the sump tank. As shown in FIGURES 2 to 5, the conveyor 16 is in the form of a series of transversely extending spiral wires 21 interlocked with each other to form a continuous belt. Rods 22 extend through certain of the spiral wires and each has ends projecting beyond the ends of the spiral wires on which rollers 23 and 24 are mounted. Rollers 23 and 24 ride in tracks 25 and 26 formed in the side plates 5 and 6 of the filter frame and which follow the contour of the perforated top plate 11.

Sprockets 17, 18, 19 and 20 are duplicated on each side of the machine and sprockets 17 are drivers having teeth in meshing engagement with successive rods 22 of the conveyor chain 16. As shown in FIGURE 3 the sprockets 17 are mounted on a shaft 29 having an end projecting outwardly beyond the side plate 6 and mounting a pulley 30. A motor 31 is connected to a reduction gear box 32 which, in turn, mounts a pulley 33 in alignment with the pulley 31. Pulleys 30 and 33 are connected by a drive chain 34. Operation of the conveyor 16 is controlled by an adjustable vacuum switch 35, see FIGURE 3, which is subjected to the pressure in the sump tank 10 and connected to operate a clutch (not shown) to start and stop the conveyor at a certain low pressure differential.

Overlying the top of sump tank 10 and conveyor 16 thereon is a liquid distributor 36, see FIGURE 1, for dissipating the velocity of the incoming liquids to be filtered and delivering it to the filter unit; and connected to the side plate 6 of the unit is an overflow discharge pipe 37 from the sump tank. Liquid distributor 36 and discharge pipe 37 are part of a fluid circuit including a pump (not shown) for circulating a liquid, such as coolant emulsion, from the filter unit to the work piece and then back to the filter unit.

The filter medium 40 is illustrated in FIGURES 1 to 5 as a sheet of paper or cloth which is drawn from a roll 41 at the right hand end of the machine. The sheet of filter medium 40 overlies and is advanced with the conveyor belt 16. As shown in FIGURE 1 the sheet of filter sheet 40 extends along the downwardly inclined end 13 of the top supporting plate 11, across the horizontal section 15 and then upwardly along the opposite inclined end 14 of the top plate and conveyor 16. The forward end of the sheet of filter medium 40 and filter cake thereon are discharged into a receptacle 42 as shown in FIGURE 1. Sealing strips 43 and 44, see FIGURE 2, of a flexible material are attached to the side plates 5 and 6 with their lower ends overlying the side edges of the sheet of filter medium 40 to seal the joints therebetween.

A vacuum pump 45 has its inlet end connected to the sump tank 10 through a conduit 46 and the end of the conduit 46 extends through the side plate 5 for this purpose. Vacuum pump 45 may be driven from motor 31 through the belt 56 and pulleys 57 and 58 as shown in FIGURE 3, or may be driven by a separate motor. By adjusting the degree of vacuum all oil may be removed from the filter cake as it moves up the inclined discharge ramp 14, see FIGURE 1, and for all practical purposes keeps all of the roll oil in the system. The discharge end of the vacuum pump 45 is connected to a conduit system 47 having a horizontal pipe 48 extending longitudinally of the filter adjacent one side and a plurality of depending branches 49, 50 and 51. Spaced headers or skimming pipes 52, 53 and 54 extend horizontally from the lower ends of the branch conduits 49, 50 and 51 across the top of the conveyor 16 and above sheet of filter medium 40 thereon. Each of the skimming pipes 52, 53 and 54 has a series of space nozzles 55 for producing jets of air across and at a small acute angle to the surface of a pool of liquid P overlying the filter sheet. The skimming pipes 52, 53 and 54 are rotatably adjustable to produce the desired angle of the nozzles 55 to produce a curtain of air for moving and directing oil from the surface of the pool P of liquid toward the right hand end thereof as shown in FIGURE 1. One form of the apparatus having now been described in detail, the mode of operation is now described.

Assuming first that the filter unit is to be used to filter a loose emulsion used to cool, lubricate and flush rolls and rolled sheet in a rolling mill. To initiate operation of the filter unit illustrated in FIGURES 1 to 5, the vacuum pump 45 is started prior to the operation of the rolling mill. Vacuum pump 45 withdraws air from the space below the conveyor 16 and sheet of filter medium 40 to evacuate the space in the sump tank 10 above any liquid level therein. Simultaneously with the operation of the rolling mill, a pump (not shown) is started to circulate the coolant emulsion from the filter unit onto the work piece and then back to the liquid distributor 36 which delivers it onto the top of the sheet of filter paper 40. The emulsion filters through the filter sheet 40 and supporting structure comprising the helical wire coils of the conveyor 16 and perforated top plate 11 into sump tank 10. Such passage of the emulsion through the filter sheet 40 is enhanced by the difference of pressure between the top and bottom of the filter paper and, during normal operation, the emulsion accumulates to form the pool P as shown in FIGURE 1. As soon as the sheet 40 or filter medium becomes wetted with the emulsion, the emulsion passes through the pores of the filter paper, but prevents the passage of dirt and other solids which accumulate on the top of the sheet to form a filter cake. As the thickness of the filter cake increases it increases the resistance to flow of the emulsion therethrough and decreases the pressure in the sump tank 10. At a predetermined low pressure in the sump tank 10, the pressure responsive switch 35 closes to operate a clutch and initiate operation of the driving sprocket 17 to advance the endless conveyor 16 and draw a clean section of the filter sheet 40 onto the right hand end of the conveyor 16. The section of clean filter sheet 40 then reduces the resistance to flow and the switch 35 opens to stop the driving sprocket 17. This starting and stopping of sprocket 17 intermittently advances the conveyor 16 and filter sheet 40 thereon to maintain an equilibrium condition in which the emulsion flows through the filter medium 40 at a constant rate and a pool P of the emulsion is maintained on the top of the filter sheet. The emulsion is filtered therethrough at a fast rate and the filtered liquid is discharged from the sump tank through the overflow pipe 37.

Simultaneously, the air being evacuated from the tank from the conduit 46 and vacuum pump 45 is delivered under pressure from the discharged end of the pump through the conduits 47 and depending branches 49, 50 and 51 and through the outlet nozzles 55 in the horizontal skimming pipes 52, 53 and 54. The series of nozzles 55 on each skimming pipe 52, 53 and 54 produces a curtain of air in a plane impinging the surface of the pool P of emulsion at a small acute angle. Any oil separated from the emulsion and floating on the surface of the pool is then forced toward the inclined end 13 of the filter unit, at the right hand end thereof as viewed in FIGURE 1, and forces it upwardly along the clean area filter sheet 40 as it enters the pool P of emulsion. This clean portion of the filter sheet 40 becomes wetted with the separated oil and passes the oil under the difference in pressure produced by the vacuum in the sump tank 10. Due to the fact that a limited amount of the oil passes through the filter and a relatively large quantity of air is then drawn through the pores, the filter medium is cleaned of all oil before the filter sheet contacts the emulsion. The same filter sheet 40 then becomes wetted with the emulsion and passes the emulsion therethrough as previously described. Thus, the filter sheet 40 which ordinarily will pass only one liquid and block the passage of another liquid then acts as separate filters to first filter the oil and thereafter clean the filter paper by a self cleaning action after which it filters the emulsion. The filtered emulsion and oil then enter the sump tank 10 to form a body of liquid with the oil floating on top of the emulsion. As the liquid level in the tank increases the liquid overflows through the discharge pipe 37, but the oil floating on the top of the emulsion first enters the overflow pipe followed by emulsion and, due to the action of the pump and flow through the coolant circuit, the oil is again dispersed into the emulsion. Thus, the filter of the present invention filters any oil separated from the emulsion as well as the emulsion to save the oil which otherwise would be lost.

FIGURE 4 illustrates the same filter being used with a tight emulsion to discharge tramp oils which may accumulate on the surface of the liquid pool. In this modified arrangement the skimming pipes 52, 53 and 54 are turned to direct the nozzles 55 at an acute angle to the surface of the pool of liquid, but toward the left or discharged end of the filter unit. With tight emulsions the separation of oil from the emulsion is negligible and the only separated oil that occurs are those unwanted oils which will not enter the emulsion, such as lubricants for bearings and the like.

The arrangement illustrated in FIGURE 4 operates generally in the same way as described with respect to FIGURES 1 to 5. However, the air discharged from the vacuum pump 45 is then delivered to the skimming pipes 52, 53 and 54 to direct successive curtains of air across the surface of the pool P to direct any tramp oils on the surface of the pool toward the sheet of filter medium 40 which moves up the inclined end 11 as it leaves the pool of emulsion. The sheet 40 then has an accumulation of dirt and solids thereon forming a filter cake and the tramp oil is forced onto the top of the filter cake beyond the left hand end of the pool P. The tramp oil is carried away with the filter cake and discharged into the receptacle 42 with the sheet 40 and filter cake thereon.

When the filter unit is used to discharge tramp oil the degree of vacuum is reduced to prevent passage of the tramp oil through the filter medium. In the two embodiments illustrated the oil is forced to one end or the other of the pool, but it will be understood that it can be directed in any direction to a place where it can be removed by filtering, conveying or by overflow.

A still further modified form of construction is illustrated in FIGURE 5 in which the filter sheet is in the form of a continuous belt 60. The continuous belt of filter medium 60 is supported by and conveyed with the conveyor belt 16 the same as in the form of construction illustrated in FIGURES 1 to 4. Belt 60 of filter medium is of a flexible, porous material to adapt it to conform to the contour of the conveyor 16 and separates from conveyor 16 at one end and nozzles 61 and 62 are provided in the space therebetween. Nozzles 61 and 62 direct jets of cleaning medium, such as air or steam, through the pores of the belt of filter medium in a reverse direction to remove the filter cake and clean the belt during its return from the leaving to the entering end of the filter unit.

It will now be observed that the present invention provides an improved method of and apparatus for skimming any oil from the surface of a pool of liquid being filtered. It will still further by observed that the present invention provides a method of and an improved filter for simultaneously filtering emulsion and any oil separated from the emulsion. It will further be observed that the present invention provides an improved method of and apparatus for removing tramp oil from the liquid being filtered and discharging it from the filter system. It will still further by observed that the present invention provides an improved filtering apparatus of simple and compact construction adapted for economical manufacture and one which is especially effective in skimming the surface of liquids being filtered.

While several embodiments of the invention are herein illustrated and described it will be understood that further changes may be made in the steps of the method and in the construction and arrangement of elements of the apparatus without departing from the spirit or scope of the invention. Therefore, without limitation in this respect the invention is defined by the following claims:

1. A method of filtering solids from a mixture of immiscible liquids having different specific gravities and each of which when passing through the filter will block the flow of the other liquid therethrough, comprising the steps of, directing a filter medium along a generally horizontal path inclined upwardly at the ends, delivering the liquids to be filtered onto the filtering medium to form a pool of the liquids thereon between the inclined ends of the horizontal path, producing a pressure less than atmospheric on the under side of said medium to promote flow of one liquid therethrough, physically displacing the other liquid floating on the top of the liquid being filtered to one end of the pool to segregate said other liquid from the body of liquid, and wet the clean filter medium with said other liquid which passes through the filter medium due to the difference in pressure, and passing a sufficient amount of gas through the filter medium to remove all of said other liquid from the pores of the filter medium before the latter is contacted by the one liquid to be filtered which will then pass through the filter medium.

2. The method of filtering solids from a mixture of immiscible liquids having different specific gravities wherein one of said liquids in passing through the filter blocks the flow of another liquid therethrough, comprising the steps of, directing a filter medium along a generally horizontal path inclined upwardly at the ends, delivering the liquids to be filtered onto the filter medium to form a pool of the liquids thereon between the inclined ends of the horizontal path, producing a pressure on the under side of said filter medium less than the pressure on the upper side to promote flow of one liquid therethrough, directing a stream of gas across the surface of the pool of liquid to physically displace and segregate said other liquid at one end of the pool of liquid beyond the liquid being filtered, drawing said segregated liquid through the filter with sufficient gas to completely remove the second liquid from the pores of the filter material before it is contacted by said one liquid of the body of liquid to be filtered whereby the same filter medium is operable to pass and filter both of the immiscible liquids.

3. A method of filtering in accordance with claim 2 in which the first liquid being filtered is an emulsion of oil and water and the second liquid is oil separated from the emulsion.

4. A method of filtering in accordance with claim 2 in which the gas is air and is withdrawn from below the filter medium for producing a pressure less than atmospheric, and then directing said air so withdrawn as a stream across the surface of the pool of liquid to segregate the second liquid from the first liquid.

5. The method of filtering solids from a mixture of immiscible liquids having different specific gravities wherein one of said liquids in passing through the filter blocks the flow of another liquid therethrough, comprising the steps of, directing a filter medium along a generally horizontal path inclined upwardly at the ends, delivering the liquids to be filtered onto the filtering medium to form a pool of the liquids thereon between the inclined ends of the horizontal path, producing a pressure less than atmospheric on the under side of said filter medium to promote flow of one liquid therethrough, said immiscible liquids comprising an emulsion of oil and water and tramp oil to be removed from the pool of emulsion, directing a stream of air across the surface of the pool of liquids toward the end of the pool from which the filtering medium is being withdrawn to deliver the tramp oil onto the filter cake on the filter medium for disposal therewith.

6. A filtering apparatus for removing solids from liquids comprising a sump tank, a filter medium mounted to move across the top of said sump tank, means for mounting the filter medium to produce a pool of liquid thereon, sealing means between the edges of the filtering medium and sides of the sump tank, conduit means below the filtering medium for discharging filtered liquid from the sump tank, a vacuum pump connected to the interior of the sump tank below the filter medium, conduit means including headers extending transversely of the filter medium over the top thereof and having nozzles projecting from one side, and means for supplying gas under pressure to the transverse headers of the conduit means for delivery through the nozzles, said nozzles being so positioned as to blow liquid over the surface of the pool of liquid toward one end of the filter medium.

7. A filtering apparatus in accordance with claim 6 in which the conduit means for supplying gas under pressure comprises a conduit extending longitudinally of the filter medium at one side thereof, a plurality of branch conduits depending from the longitudinally extending conduit, and each depending branch being connected to a transverse header having nozzles.

8. A filtering apparatus in accordance with claim 7 in which the means for supplying gas under pressure to the transverse headers is the exhaust from the vacuum pump.

9. A filtering apparatus in accordance with claim 6 in which the means for mounting the filter medium is a continuous conveyor, tracks at opposite sides of the conveyor having a centrally located horizontal portion and upwardly inclined portions at opposite ends of the horizontal portion, said conveyor having hingedly connected sections to render it flexible and rollers at the ends of at least certain of the sections and located in said tracks to guide the conveyor, and means for driving the conveyor.

10. A filtering apparatus in accordance with claim 7 in which the filter medium is a continuous sheet of paper supported on the top of the conveyor.

11. A filtering apparatus in accordance with claim 7 in which the filter medium is a continuous sheet of a flexible material in the form of a belt.

References Cited
UNITED STATES PATENTS

| | | | |
|---|---|---|---|
| 1,881,404 | 10/1932 | Hadley | 210—400 X |
| 2,813,074 | 11/1957 | Banks et al. | 210—74 X |
| 2,861,688 | 11/1958 | Harms | 210—73 |
| 2,880,875 | 4/1959 | Alston | 210—401 |
| 2,983,383 | 5/1961 | Wallace et al. | 210—97 |

REUBEN FRIEDMAN, *Primary Examiner.*

J. ADEE, *Assistant Examiner.*